US012141338B1

(12) United States Patent
Yu et al.

(10) Patent No.: US 12,141,338 B1
(45) Date of Patent: Nov. 12, 2024

(54) PORTABLE VIRTUAL TASTE GENERATOR

(71) Applicant: City University of Hong Kong, Hong Kong (HK)

(72) Inventors: Xinge Yu, Hong Kong (HK); Yiming Liu, Hong Kong (HK); Wooyoung Park, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 18/398,206

(22) Filed: Dec. 28, 2023

(51) Int. Cl.
*G06F 3/01* (2006.01)
*H02M 3/157* (2006.01)

(52) U.S. Cl.
CPC ............. *G06F 3/011* (2013.01); *H02M 3/157* (2013.01)

(58) Field of Classification Search
CPC ........................................................ G06F 3/011
See application file for complete search history.

(56) References Cited

U.S. PATENT DOCUMENTS

| 2015/0164143 | A1* | 6/2015 | Maas | .................... | H05B 3/0014 |
| | | | | | 392/395 |
| 2019/0029326 | A1* | 1/2019 | Qiu | .......................... | A24F 40/44 |
| 2019/0041975 | A1* | 2/2019 | Anderson | ............... | A61B 5/381 |
| 2021/0373653 | A1* | 12/2021 | Serita | ..................... | G06T 11/60 |

FOREIGN PATENT DOCUMENTS

CN 116531633 A * 8/2023

OTHER PUBLICATIONS

Miyashita, Homei, "Integrating Taste Technology with Audiovisual Media", 2021, IEEE, 2021 IEEE International Electron Devices Meeting (IEDM) (Year: 2021).*
Translation of CN-116531633-A (Year: 2023).*
Nimesha Ranasinghe et al., "Simulating the Sensation of Taste for Immersive Experiences", Proceedings of the 2013 ACM international workshop on Immersive media experiences, 2013, p. 29-34.
(Continued)

*Primary Examiner* — Liliana Cerullo
(74) *Attorney, Agent, or Firm* — Idea Intellectual Limited; Margaret A. Burke; Sam T. Yip (57) ABSTRACT

The present invention provides a virtual taste generator comprising: a virtual taste interface including: a housing having taste generation channels orthogonally extending through the housing from a top surface to a bottom surface; conductive tastable gels accommodated in the plurality taste generation channels respectively; each having a top end exposed on the top surface of the housing and a bottom end exposed on the bottom surface of the housing; a control system including: switches respectively connected to conductive tastable gels and configured for conducting or blocking electrical currents flowing through the conductive tastable gels respectively; and a controller connected to the switches and configured to generate electrical signals for turning on or off the switches respectively; and wherein each conductive tastable gel is embedded with one or more tastable ion electrophoresis tastable chemical agent and controllably to produce a specific taste through ion electrophoresis.

10 Claims, 6 Drawing Sheets

(56) References Cited

OTHER PUBLICATIONS

Nimesha Ranasinghe et al., "Tongue Mounted Interface for Digitally Actuating the Sense of Taste", 2012 16th International Symposium on Wearable Computers, 2012, p. 80-87.
Adrian David Cheok et al., "Chapter 5—Thermal Taste Interface", Virtual Taste and Smell Technologies for Multisensory Internet and Virtual Reality, 2018, p. 69-92.
Asif Ullah et al., "E-Taste: Taste Sensations and Flavors Based on Tongue's Electrical and Thermal Stimulation", Sensors, 2022, vol. 22, No. 4976, p. 1-12.
Dan Maynes-Aminzade, "Edible Bits: Seamless Interfaces between People, Data and Food", Conference on human factors in computing systems (CHI'05)-extended abstracts, 2005, p. 1-4.
Kasun Karunanayaka et al., "New Thermal Taste Actuation Technology for Future Multisensory Virtual Reality and Internet", IEEE transactions on visualization and computer graphics, 2018, vol. 24, No. 4, p. 1496-1505.
Nimesha Ranasinghe et al., "Digital Lollipop: Studying Electrical Stimulation on the Human Tongue to Simulate Taste Sensations", ACM Transactions on Multimedia Computing, Communications, and Applications, 2016, vol. 13, No. 1, Article 5, p. 1-22.
Adrian David Cheok et al., "Virtual Taste and Smell Technologies for Multisensory Internet and Virtual Reality", 2018, Springer.
Nimesha Ranasinghe et al., "Virtual ingredients for food and beverages to create immersive taste experiences: The sensation of taste as an electronic media", Multimedia Tools and Applications, 2016, vol. 75, p. 12291-12309.
Nimesha Ranasinghe et al., "Vocktail: A Virtual Cocktail for Pairing Digital Taste, Smell, and Color Sensations", Proceedings of the 25th ACM international conference on Multimedia, 2017, p. 1139-1147.
Homei Miyashita, "Norimaki Synthesizer: Taste Display Using Ion Electrophoresis in Five Gels", Extended Abstracts of the 2020 CHI Conference on Human Factors in Computing Systems, 2020, p. 1-6.

\* cited by examiner

PORTABLE VIRTUAL TASTE GENERATOR

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to virtual taste generation. More specifically the present invention relates to a portable virtual taste generator for immersive media application in virtual, augmented, and mixed reality (VR/AR/MR) environments.

BACKGROUND OF THE INVENTION

As immersive media continues to advance, endeavours have been undertaken to integrate multisensory elements into digital interactions. Various techniques have emerged to create artificial or virtual tastes by stimulating the sense of taste. One approach involves the application of flavouring chemicals directly to the tongue through licking, resulting in specific tastes based on the quantities of these chemicals. However, this method necessitates the use of cartridges and chambers, making it cumbersome and challenging to maintain a variety of tastes.

Another approach employs thermal stimulation, where certain tastes are produced by altering the temperature of the tongue within a range of 10° C. to 40° C. For instance, heating can elicit oiliness, sweetness, warmth, and electric taste, while reducing sensitivity to metallic taste. Conversely, cooling can evoke sensations of mint, coldness, and pleasantness. Nevertheless, the range of tastes achievable through thermal stimulation is notably limited. Moreover, systems utilizing this method often involve a sizable liquid cooling pump, fan, and a Peltier module, demanding high electrical power for operation at the expense of portability.

Electrical stimulation approaches leverage electrical pulses with varying magnitudes of current, electrode polarity, and frequency to recreate different basic tastes such as sour, salty, spicy, sweet, and bitter flavors. However, achieving a broad spectrum of food flavors through electrical stimulation remains challenging.

A taste feedback system, recently introduced, integrates chemical and electrical stimulations. This method employs taste channels incorporating ion electrophoresis chemicals, utilizing electrical currents to generate diverse tastes. However, the reported system incorporates the human body as part of the driving circuit, leading to taste variations among users. Consequently, there is a need for a more stable and miniaturized virtual taste system.

SUMMARY OF THE INVENTION

To address above critical flaws of bulky tasting platform or controlling circuit and limited number of taste options, the present invention provides a portable taste generator which is entirely wireless, highly miniaturized, and light in weight, and capable of generating a wider variance of tastes.

In accordance with a first aspect of the present invention, a virtual taste generator is provided. The virtual taste generator comprises: a virtual taste interface including: a housing having a top surface, a bottom surface opposite to the top surface, and a plurality taste generation channels orthogonally extending through the housing from the top surface to the bottom surface; a plurality of conductive tastable gels accommodated in the plurality taste generation channels respectively; each having a top end exposed on the top surface of the housing and a bottom end exposed on the bottom surface of the housing; a control system including: a plurality of switches respectively connected to the plurality of conductive tastable gels and configured for conducting or blocking a plurality of electrical currents flowing through the plurality of conductive tastable gels respectively; and a controller electrically connected to the plurality of switches and configured to generate a plurality of electrical signals for turning on or off the plurality of switches respectively; and wherein each conductive tastable gel is embedded with one or more tastable ion electrophoresis tastable chemical agent and controllably to produce a specific taste through ion electrophoresis.

In one embodiment of the first aspect of present invention, the control system further comprises a communication module configured for wirelessly receiving a command signal for commanding the controller.

In one embodiment of the first aspect of present invention, the control system further comprises a first low-dropout regulator for regulating a first DC voltage applied to the tastable channels; and a second low-dropout regulator for regulating a second DC voltage applied to the communication module.

In one embodiment of the first aspect of present invention, the virtual taste generator further comprises: a top circuit board arranged on the top surface of the housing and including a plurality of first interconnects configured for electrically connecting the top ends of the plurality of conductive tastable gels to the plurality of switches respectively; and a bottom circuit board arranged on the bottom surface of the housing and including a plurality of second interconnects configured for electrically connecting the bottom ends of the plurality of conductive tastable gels to a ground.

In one embodiment of the first aspect of present invention, each first interconnect includes a first contact pin configured for protruding into a corresponding top end of conductive tastable gel; and each second interconnect includes a second contact pin configured for protruding into a corresponding bottom end of conductive tastable gel.

In one embodiment of the first aspect of present invention, each of the first and second contact pins is made of platinum (Pt) or silver (Ag).

In one embodiment of the first aspect of present invention, the top circuit board further includes a plurality of openings respectively aligned with the plurality of conductive tastable gels to expose the top ends of the conductive tastable gels.

In one embodiment of the first aspect of present invention, each of the top and bottom circuit boards is a flexible printed circuit board.

In one embodiment of the first aspect of present invention, the conductive tastable gel is an agarose gel.

In one embodiment of the first aspect of present invention, the housing is made of Nylon.

BRIEF DESCRIPTION OF THE DRAWINGS

Embodiments of the invention are described in more details hereinafter with reference to the drawings, in which.

DETAILED DESCRIPTION

In the following description, details of the present invention are set forth as preferred embodiments. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
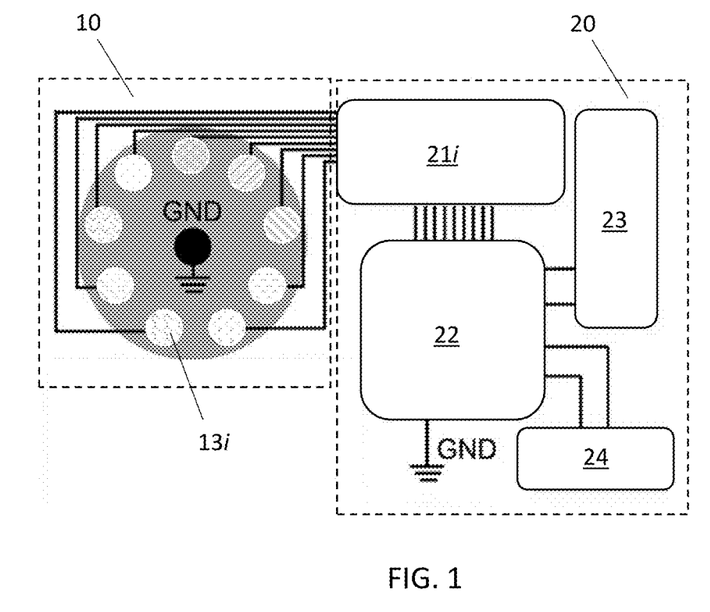
FIGS. 1 and 2 show a block diagram and an exploded view of a virtual taste generator according to one embodiment of the present invention.
Figure 2:
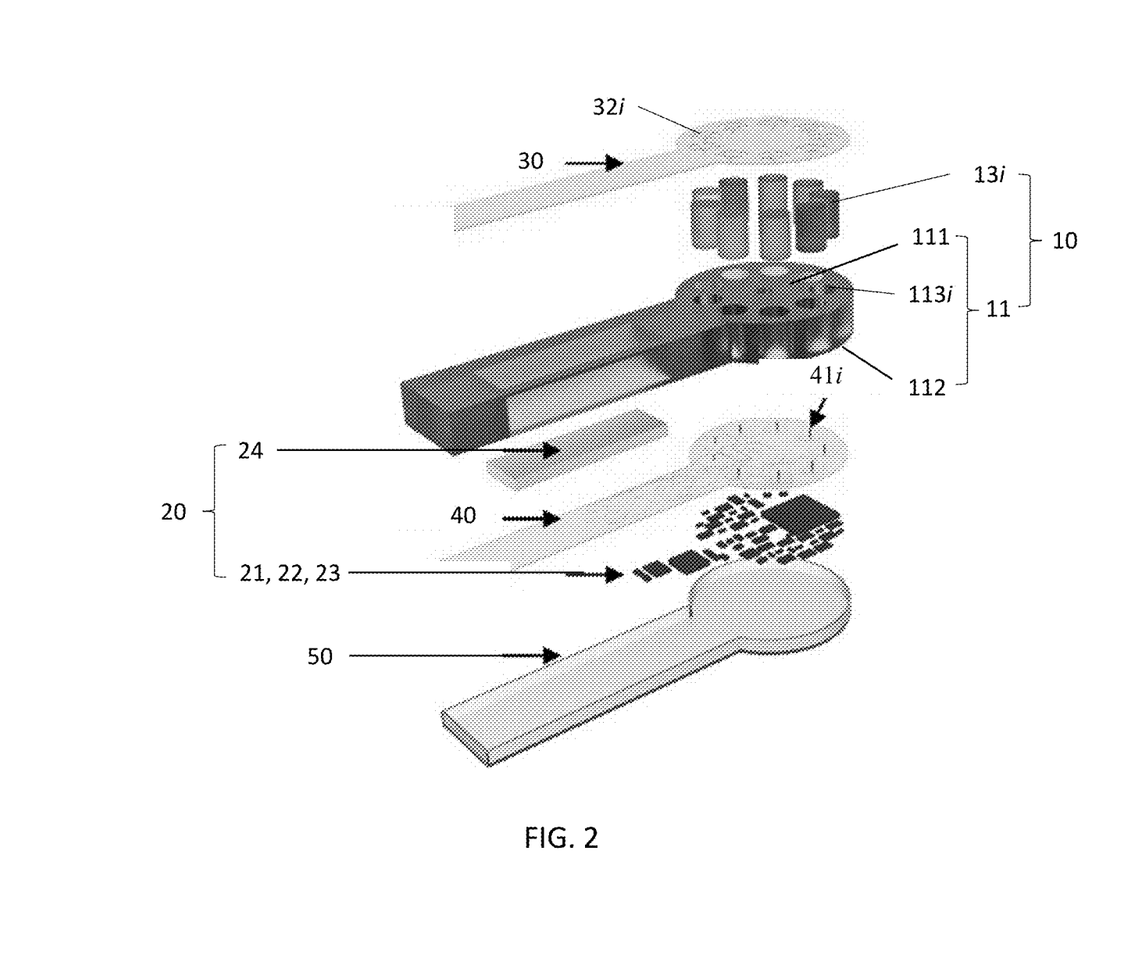

FIGS. 1 and 2 show a block diagram and an exploded view of a virtual taste generator according to one embodiment of the present invention. As shown, the virtual taste generator may comprise a virtual taste interface 10 and a control system 20.

The virtual taste interface 10 may include a housing 11 having a top surface 111, a bottom surface 112 opposite to the top surface. The housing may further have a plurality of taste generation channels 113$i$ (where i is a positive integer) orthogonally extending through the housing from the top surface 111 to the bottom surface 112. The housing 11 may be made of a biocompatible 3D printing material (e.g. Nylon) and fabricated by 3D printing.

The virtual taste interface 10 may further comprise a plurality of conductive tastable gels 13$i$ accommodated in the plurality taste generation channels 113$i$ respectively. Each conductive tastable gel 13$i$ may have a top end exposed on the top surface 111 of the housing and a bottom end exposed on the bottom surface 112 of the housing.

In some embodiments, each conductive tastable gel 13$i$ may be composed of an agarose gel embedded with a tastable chemical agent. When an electrical current is flowing through the tastable gel, the tastable gel is extruded to produce a specific taste through ion electrophoresis.

The tastable agents may be, but not limited to, sugar, salt (NaCl), citric acid, cherry, passion fruit, green tea, milk, durian, grapefruit or a combination thereof.

The control system 20 may comprise a plurality of switches 21$i$ respectively connected to the plurality of conductive tastable gels 13$i$ and configured for conducting or blocking a plurality of electrical currents flowing through the plurality of conductive tastable gels 13$i$ respectively. Each switch may be constructed with a N-type MOSFET (NMOS) and a P-type MOSFET (PMOS).

The control system 20 may further comprise a processor 22, such as a microcontroller unit (MCU), connected to the plurality of switches 21$i$ and configured to generate a plurality of electrical signals for turning on or off the plurality of switches 21$i$ respectively.

The control system 20 may further comprise a communication module 23, such as a Bluetooth module, configured to wirelessly receiving a command signal for commanding the controller 22. When a command is received to open specific channels, the corresponding digital pins (e.g., GPI/Os) of the controller are turned high (e.g., 5V) to turn on the switches to allow electrical current flowing through the agarose gel for extruding tasteful agents embedded in the agarose gel through ion electrophoresis. When a command is received to close specific channels, the digital GPI/Os are turned low (e.g., 0V) to turn off the switches to block any electrical current flowing through the agarose gel.

The control system 20 may further include a battery 24 (e.g., a 4.2 V, 500 mAh Lithium-ion battery) to act as a main power supply. The control system 20 may further include a first low-dropout regulator (not shown) for regulating a first DC voltage applied to the tastable channels; and a second low-dropout regulator (not shown) for regulating a second DC voltage applied to the communication module. Typically, the first DC voltage applied to the tastable channels is limited to 2V due to safety issues.

The virtual taste generator may further comprise a top circuit board 30 arranged on the top surface 111 of the housing and including a plurality of first interconnects (not shown) configured for electrically connecting the top ends of the plurality of conductive tastable gels 32$i$ to the plurality of switches 21$i$ respectively. Each first interconnect includes a first contact pin configured for protruding into a corresponding top end of conductive tastable gel 13$i$. The top circuit board further includes a plurality of openings 32$i$ respectively aligned with the plurality of conductive tastable gels 13$i$ to expose the top ends of the conductive tastable gels.

The virtual taste generator may further comprise a bottom circuit board 40 arranged on the bottom surface 112 of the housing 11 and including a plurality of second interconnects configured for electrically connecting the bottom ends of the plurality of conductive tastable gels 13$i$ to the ground GND. Each second interconnect includes a second contact pin 41$i$ configured for protruding into a corresponding bottom end of conductive tastable gel.

Alternatively, the first interconnects may be configured for electrically connecting the top ends of the plurality of conductive tastable gels 32$i$ to the ground GND and the second interconnects 41$i$ may be configured for electrically connecting the bottom ends of the plurality of conductive tastable gels to the plurality of switches 21$i$ respectively.

The circuit boards may be flexible printed circuit boards, preferably having a thickness of 0.21 mm. The bottom circuit board may be configured for accommodating the switches, processor, communication module, low-dropout regulators and other electrical components.

The contact pins may be made of any suitable biocompatible conductive materials, including but not limited to, platinum (Pt) or silver (Ag). Preferably, the virtual taste generator may further comprise a protective layer 50, such as a machined or 3D-printer part or an encapsulation, covering the electrical components of the control system 20.

In some embodiments, the plurality of first interconnects may be implemented by fabricating a plurality of conductive vias extending through the housing from the top surface to the bottom surface. Each of conductive vias may be positioned adjacent to a corresponding tastable channel and connected to the tastable gel in the corresponding channel through a redistributing trace connecting the channel and the vias. As such, the top circuit board may be omitted.

Figure 3:
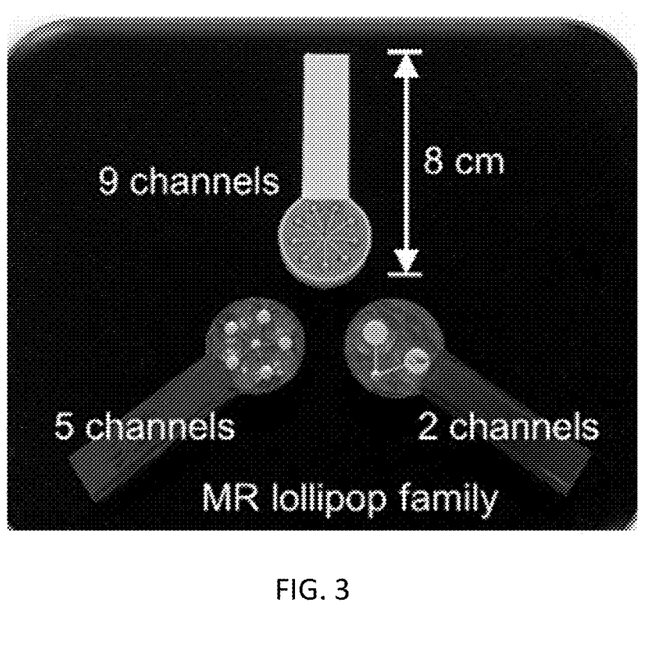
FIG. 3 shows three prototypes of virtual taste generators.

FIG. 3 shows three prototypes of virtual taste generators. The virtual taste generator may have a lollipop shape and a total length of around 8 cm for portability and familiarity. The number of tastable channels may range from 2 to 9. For example, 5 taste channels can be used to provide the 5 basic tastes: sweet, sour, salty, bitter, and umami. Each tastable channel may have a diameter ranging from 5 mm to 15 mm and a thickness substantially equal to 7 mm such that the channels can be arranged to form a taste interface area with a size of 2.5 to 3.5 cm, preferably equal to 3 cm, which is convenient for licking.

Figure 4:
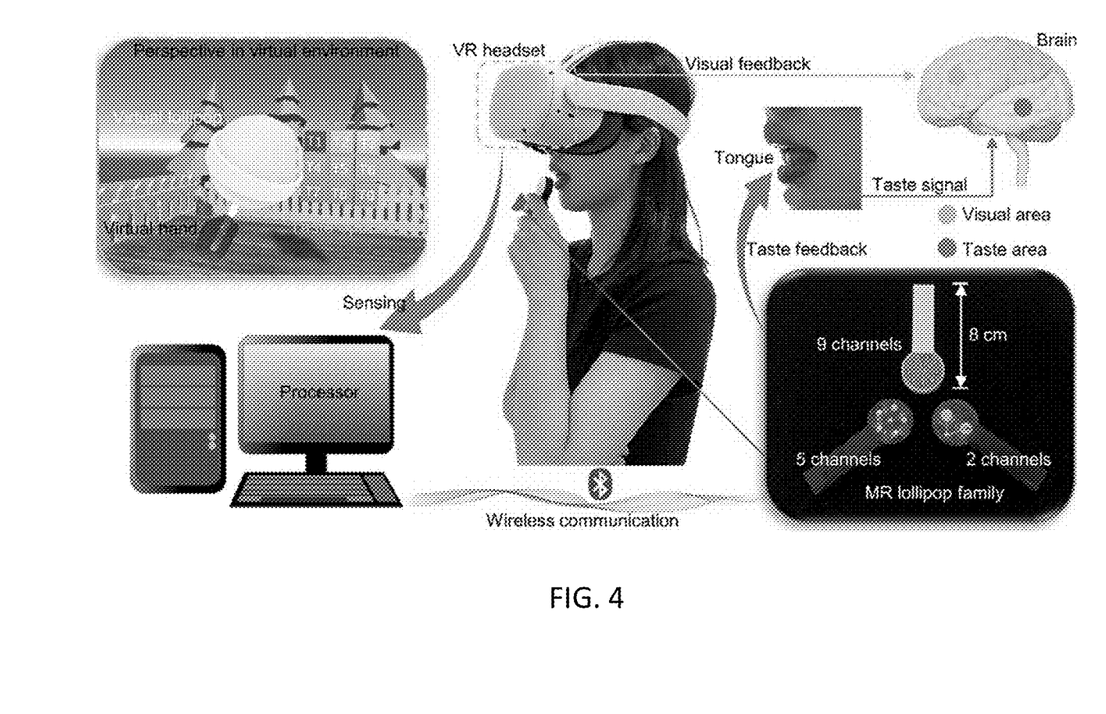
FIG. 4 shows a schematic diagram illustrating how the virtual taste generator is used in a MR application.
Figure 5A:
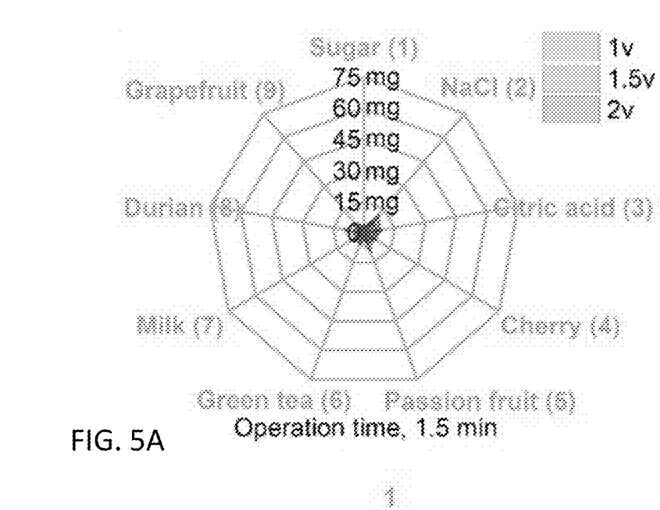
FIGS. 5A to 5D show the generated chemical solution mass as a function of voltage input, chemical types for various operation times.
Figure 5B:
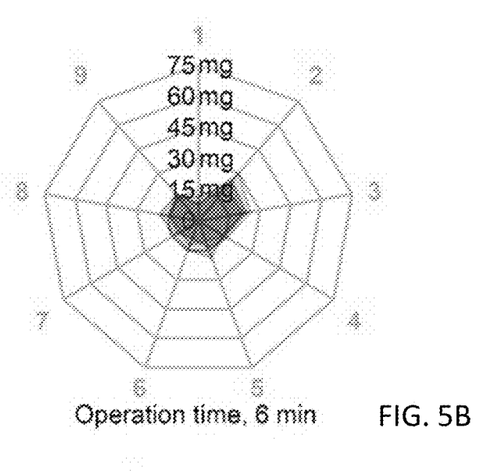
Figure 5C:
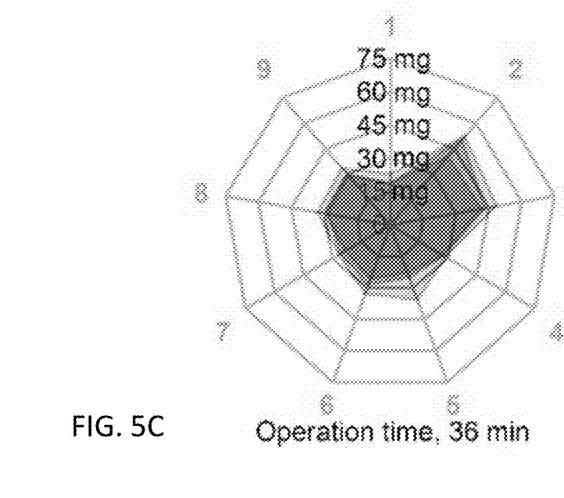
Figure 5D:
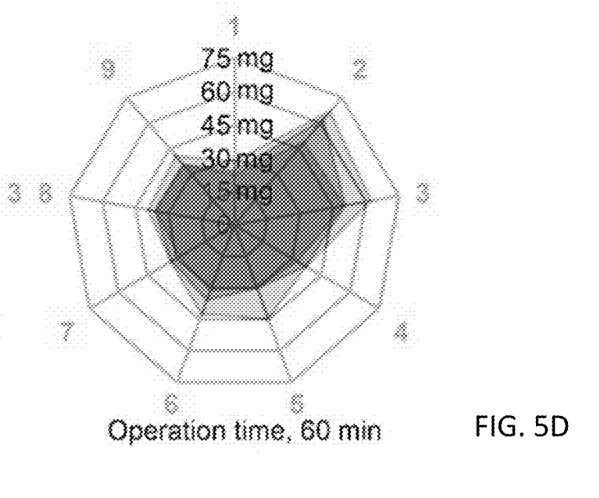
Figure 6A:
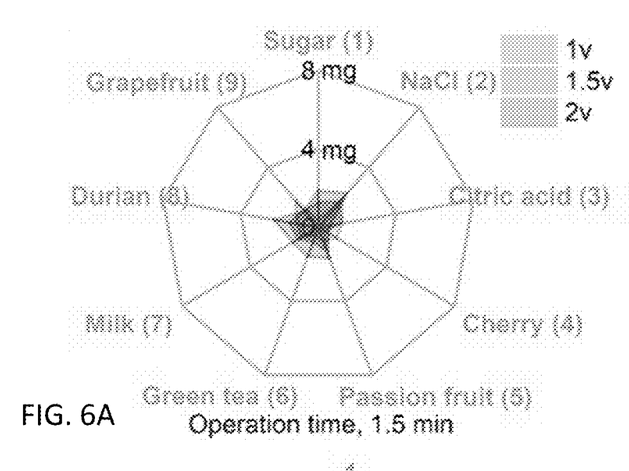
FIGS. 6A to 6D show the generated pure chemical mass as a function of voltage input, chemical types for various operation times.
Figure 6B:
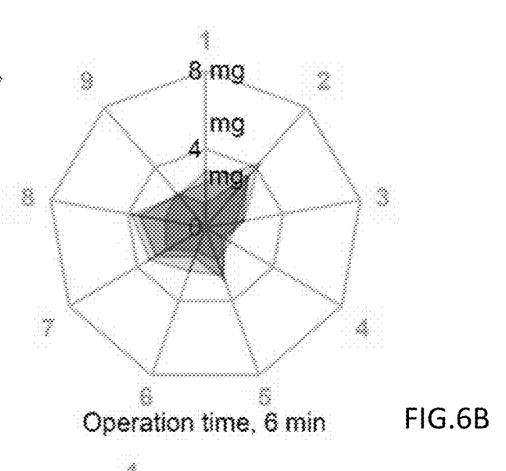
Figure 6C:
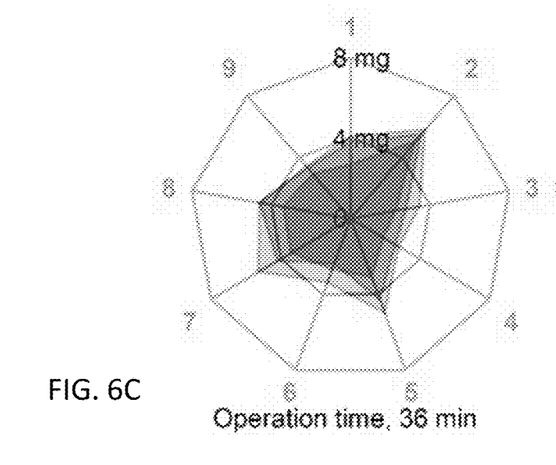
Figure 6D:
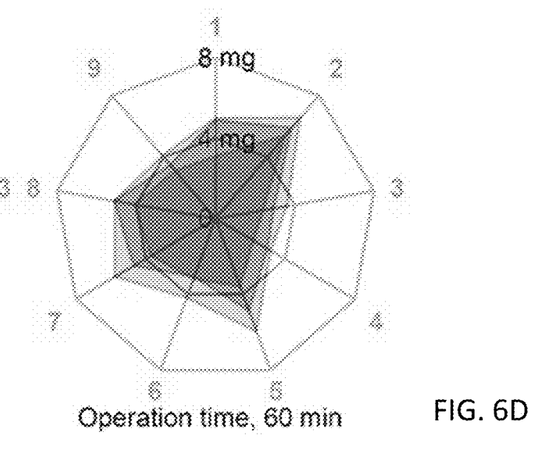

FIG. 4 shows a schematic diagram illustrating how the virtual taste generator is used in a MR application. As shown, a user can enjoy a virtual lollipop in a virtual environment by licking the virtual taste interface of the virtual taste generator. With the provided virtual taste generator, the taste feedback intensity can be well-controlled by variating the voltage input, and the user can constantly enjoy the taste feedback for over 1 hr.

FIGS. 5A to 5D show the generated chemical solution mass as a function of voltage input, chemical types for various operation times. The higher voltage input and longer operation time could generate more chemical solution. Among the 9 different chemicals, NaCl and citric acid based gels could generate more solutions, compared to the others, which may be induced by the higher conductivity. FIGS. 6A to 6D show the generated pure chemical mass as a function of voltage input, chemical types for various operation times, which present same tendency as the results shown in FIGS. 5A to 5D.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A portable virtual taste generator comprising:
   a virtual taste interface including:
      a housing having a top surface, a bottom surface opposite to the top surface, and a plurality taste generation channels orthogonally extending through the housing from the top surface to the bottom surface;
      a plurality of conductive tastable gels accommodated in the plurality taste generation channels respectively; each having a top end exposed on the top surface of the housing and a bottom end exposed on the bottom surface of the housing;
   a control system including:
      a plurality of switches respectively connected to the plurality of conductive tastable gels and configured for conducting or blocking a plurality of electrical currents flowing through the plurality of conductive tastable gels respectively; and
      a controller electrically connected to the plurality of switches and configured to generate a plurality of electrical signals for turning on or off the plurality of switches respectively; and
   wherein each conductive tastable gel is embedded with one or more tastable ion electrophoresis tastable chemical agent and controllably to produce a specific taste through ion electrophoresis.

2. The portable virtual taste generator according to claim 1, wherein the control system further comprises a communication module configured for wirelessly receiving a command signal for commanding the controller.

3. The portable virtual taste generator according to claim 2, wherein the control system further comprises
   a first low-dropout regulator for regulating a first DC voltage applied to the tastable channels; and
   a second low-dropout regulator for regulating a second DC voltage applied to the communication module.

4. The portable virtual taste generator according to claim 3, wherein each of the top and bottom circuit boards is a flexible printed circuit board.

5. The portable virtual taste generator according to claim 1, further comprising:
   a top circuit board arranged on the top surface of the housing and including a plurality of first interconnects configured for electrically connecting the top ends of the plurality of conductive tastable gels to the plurality of switches respectively; and
   a bottom circuit board arranged on the bottom surface of the housing and including a plurality of second interconnects configured for electrically connecting the bottom ends of the plurality of conductive tastable gels to a ground.

6. The portable virtual taste generator according to claim 5, wherein
   each first interconnect includes a first contact pin configured for protruding into a corresponding top end of conductive tastable gel; and
   each second interconnect includes a second contact pin configured for protruding into a corresponding bottom end of conductive tastable gel.

7. The portable virtual taste generator according to claim 6, each of the first and second contact pins is made of platinum (Pt) or silver (Ag).

8. The portable virtual taste generator according to claim 5, wherein the top circuit board further includes a plurality of openings respectively aligned with the plurality of conductive tastable gels to expose the top ends of the conductive tastable gels.

9. The portable virtual taste generator according to claim 1, wherein the conductive tastable gel is an agarose gel.

10. The portable virtual taste generator according to claim 1, wherein the housing is made of Nylon.

* * * * *